Nov. 7, 1967   D. J. DE MICHELE   3,350,944
STRAIN GAUGE PRESSURE TRANSDUCER
Filed Oct. 17, 1963   2 Sheets-Sheet 1
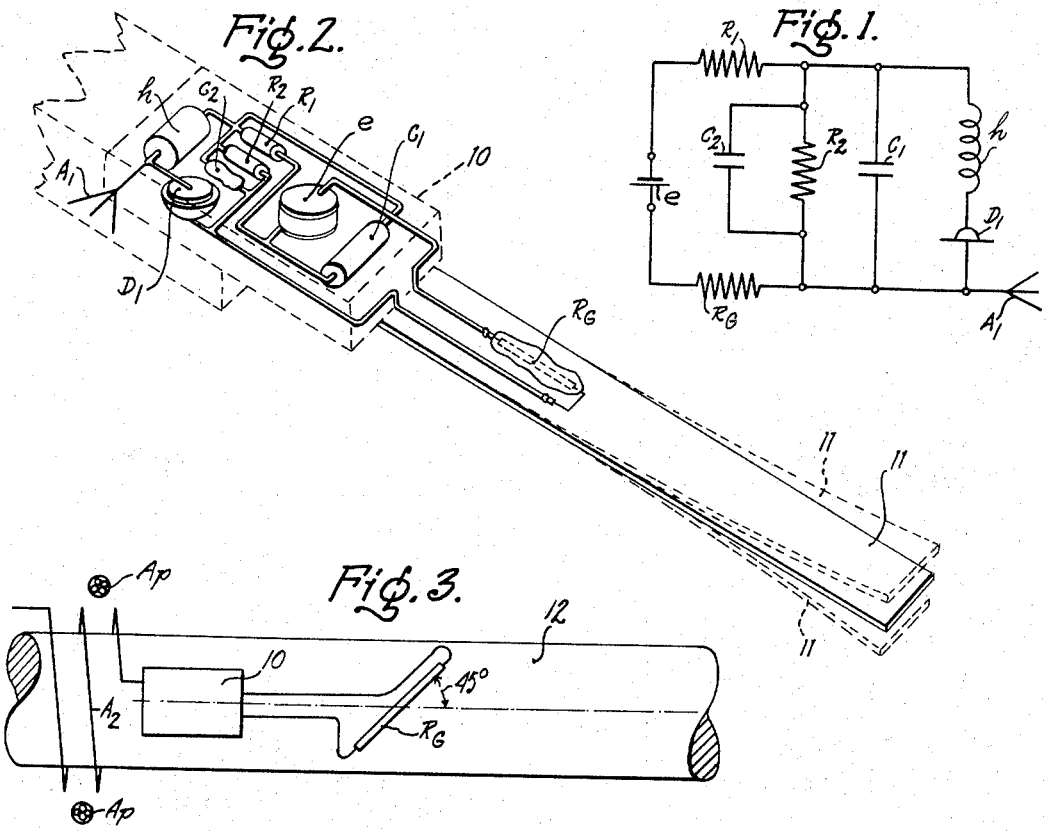
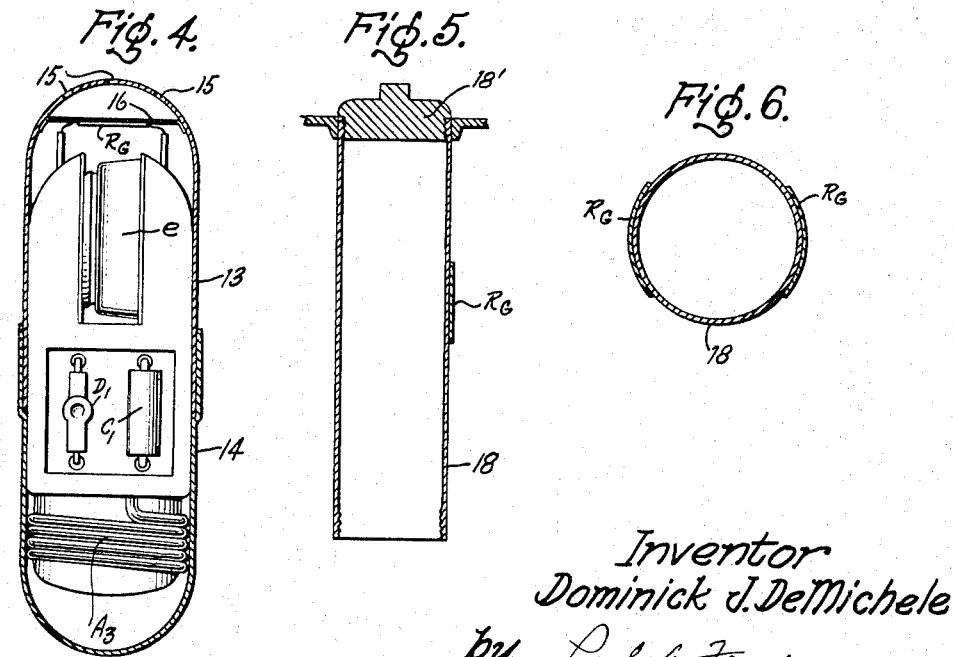
Inventor
Dominick J. DeMichele
by Paul A. Frank
His Attorney Nov. 7, 1967  D. J. DE MICHELE  3,350,944
STRAIN GAUGE PRESSURE TRANSDUCER
Filed Oct. 17, 1963  2 Sheets-Sheet 2

Inventor
Dominick J. DeMichele
by Paul A. Frank
His Attorney

United States Patent Office 3,350,944
Patented Nov. 7, 1967

3,350,944
STRAIN GAUGE PRESSURE TRANSDUCER
Dominick J. De Michele, Schenectady, N.Y., assignor to General Electric Company, a corporation of New York
Filed Oct. 17, 1963, Ser. No. 316,895
4 Claims. (Cl. 73—398)

The present invention relates to strain gages and, more particularly, relates to a miniaturized self-transmitting strain gage.

Conventional strain gages of the wire resistance type, although adequate for many purposes, are limited due to their relatively low sensitivity. That is, the resistance change for a given strain is relatively small. Due to this limitation, when such a gage is used in an environment where the measurement must be transmitted, it has been found necessary to use amplifying and transmitting circuits in combination with the strain gage. In applications where miniaturization is critical, the additional size and weight of these circuits presents a severe problem. Also, the cost of the additional components adds greatly to the expense of the system.

The present invention is directed to the utilization of the higher sensitivity of piezoresistive strain sensors in a miniaturized self-transmitting strain gage whereby the additional amplifying and transmitting circuits referred to above are not required.

It is accordingly an object of the present invention to provide a miniaturized self-transmitting strain gage.

A further object of the present invention is the provision of a self-transmitting strain gage which utilizes a piezoresistive strain sensitive element.

Further objects and advantages of the present invention will become apparent as the description and illustration thereof proceed.

Briefly, in accordance with one form of the present invention, a strain gage is provided, for measuring strain on a member and for transmitting an indication thereof. The strain gage comprises a piezoresistive strain sensor arranged for mounting on the member so as to be subject to strain thereon and an oscillator circuit including a voltage source controlled by the strain sensor. More specifically, in a particular embodiment, the oscillator circuit may comprise a tunnel diode used as a voltage-sensitive switch to cause oscillation of a tuned circuit supplied by a DC voltage. The voltage supplied to the oscillator circuit is controlled by the resistance of the strain sensor and thus, the frequency of oscillation of the tuned circuit is varied in accordance with the strain measured by the sensor.

Specific embodiments of the present invention include, in addition to simple strain or torsion measurements, adaptations of the gage to measure pressure changes and vibrational or unidirectional acceleration.

The novel features intended to be included in the present invention are set forth in the appended claims. The invention itself, together with further objects and advantages thereof, may best be understood by a consideration of the following specification and appended drawings in which:

FIGURE 1 is a schematic representation of a circuit embodying the present invention;

FIGURE 2 is an illustration of a strain gage constructed in accordance with the present invention and adapted for the measurement of tension or compression;

FIGURE 3 is a schematic illustration of a modified form of the strain gage of this invention arranged for measuring torsion;

FIGURE 4 is a cross-sectional view of an encapsulated strain gage according to the present invention;

FIGURE 5 is a partial cross-sectional view of a modified form of an encapsulated strain gage;

FIGURE 6 is a modification of the gage of FIGURE 5;

Figure 7:
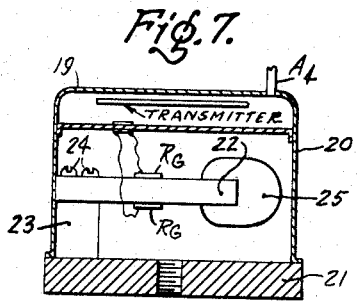
FIGURE 7 is a vertical cross-sectional view of the self-transmitting strain gage of the present invention arranged for use as a vibration accelerometer.

The circuit shown in FIGURE 1 is that of a relaxation oscillator with the strain sensor so placed that variation of its resistance due to a strain will cause a corresponding variation in the frequency of the oscillator. The circuit comprises a voltage source such as a battery $e$, resistors $R_1$ and $R_2$, a tuned circuit comprising capacitors $C_1$ and $C_2$ and inductor $h$, a tunnel diode $D_1$ and a piezoresistive strain sensor $R_G$ represented by a resistance. An antenna $A_1$ is provided for transmitting purposes. In operation, the resistors $R_1$, $R_2$ and $R_G$ form a voltage divider which provides a stable low impedance input to the oscillator circuit while the resistance $R_G$ determines the voltage applied to the diode $D_1$.

When the voltage is initially applied, the tunnel diode is in its high conduction state and permits current flow. The inductor $h$ resists the rapid build-up of current and thereby controls the frequency of operation. Within a short time, the voltage at the anode of the diode $D_1$ is sufficiently high to switch the diode to its low conduction state. At this point, the inductor $h$ acts as a current generator since it opposes a sudden decrease of current. It therefore controls the frequency by controlling the rate of current decrease. When the current decreases sufficiently, the diode is again switched to its high conduction state and the cycle described above is repeated. The capacitor $C_1$ functions as a tuning capacitor to stabilize the frequency of operation of the oscillator circuit. Capacitor $C_2$ is a fine tuning capacitor and may be variable or may be omitted altogether if $C_1$ alone provides the correct capacity.

Since the voltage applied to the oscillator is determined by a voltage divider including the resistance of the strain sensor $R_G$, the frequency of the oscillator will change in proportion to any change in the strain measured. The antenna $A_1$ transmits the oscillator signal as modulated by the strain sensor to an appropriate receiver (not shown). The receiver may comprise means for converting the modulated signal to produce an audio output or to control other media such as a meter, an oscillograph, or an oscilloscope. In practical operation it has been found that signals from the self-transmitting strain gage of FIGURE 1 can be received by ordinary FM receivers at distances of one hundred feet or more.

The strain sensor $R_G$ may be composed of any piezoresistive material. The most commonly used material is P-type silicon since it has many advantages. It is chemically inert, stable over a wide range of temperatures, flexible, and mechanically strong. Large piezo-electric effects, resulting in high sensitivity to strain, are obtained from single crystals when the strains are applied along crystallographic axes.

In FIGURE 2, a practical embodiment of the circuit schematically illustrated in FIGURE 1, the components are shown mounted in an appropriate housing 10 and the strain sensor is placed in position for measuring strain on a cantilevered bar 11. The upper and lower dotted outlines of the bar 11 indicate, respectively, compression and tension on the strain sensor. In either case, the resistance $R_G$ will change appropriately, producing a proportional change in the transmitter output frequency in the manner described above.

In FIGURE 3, the transmitter housing 10 and strain sensor $R_G$ are shown mounted on a rod or shaft 12 whereby torsion occurring in the shaft may be measured. As indicated, the sensor is positioned at a 45 degree angle to the axis of the shaft to provide maximum resistance change for a given amount of twist in the shaft. In this embodiment a wire $A_2$ surrounding the shaft is used as the transmitting antenna and a pick-up or receiving antenna $A_p$ is disposed around the shaft and radially outward from antenna $A_2$ to insure proper transmission of the signals regardless of shaft rotation. The particular advantage of this arrangement is that it avoids the slip rings which are usually required for direct electrical contact between a strain sensor and its recording apparatus. The miniaturized self-transmitting strain gage of the present invention can be placed on the shaft without difficulty and a receiving apparatus some distance away receives the measurements without direct electrical connection. While in FIGURE 3 I have illustrated only a single sensor, two or four sensors may be utilized in a Wheatstone bridge arrangement. The use of a greater number of sensors is particularly desirable when very small strains are being measured.

The advantages of the miniaturization permitted by the present invention becomes particularly evident upon a consideration of FIGURE 4 which shows an encapssulated self-transmitting strain gage adapted to be swallowed by a person when internal body pressures are to be measured. The capsule comprises two telescoping portions 13 and 14 and the entire gage is enclosed therein. A diaphragm 16 is placed across the capsule near one end. Fluids enter the capsule through apertures 15 and the pressure of such fluids is exerted on the diaphragm 16. The piezoresistive strain sensor $R_G$ is placed immediately adjacent the diaphragm 16. The strain on diaphragm 16 is measured by the sensor $R_G$, and the signal from antenna $A_3$ is appropriately affected thereby.

FIGURE 5 shows another embodiment of the device of FIGURE 4. The hollow tube 18 extends along the center of the capsule and is closed at one end by a cap or closure member 18', illustrated as being threaded into tube 18. Strain sensor $R_G$ is mounted longitudinally on the outside of tube 18 and within capsule 13, 14 along with the remaining components, for example, the oscillator (not illustrated) of the transmitter. Preferably all such components are encapsulated to provide a fluid-tight structure. In operation pressures applied within tube 18 are directly sensed by sensor $R_G$ to vary the frequency of the transmitter as previously explained. FIGURE 6 illustrates a modification of the structure of FIGURE 5 in which sensors $R_G$ partially encircle tube 18 to provide an arrangement particularly adapted to measure hoop strains.

Referring now to FIGURE 7, another arrangement utilizing the self-transmitting strain gage of the present invention is illustrated. In this case the circuit components are enclosed in a transmitter housing 19 and an antenna $A_4$ extends therefrom. The housing 19 is attached, through an extension 20 of its sides, to a mount 21. A pair of piezoresistive strain gages $R_G$ are placed on a beam 22 which is cantilevered from a support 23 mounted on the mount 21. The beam is attached at its fixed end by screws 24, and a mass 25 is mounted on the other end of the beam.

When the object to which the mount 21 is attached is accelerated or vibrated, the mass 25 causes the beam 22 to flex, thus producing a strain which is measured by the sensor $R_G$. Since the strain is proportional to the acceleration, the output of the transmitter is a measure of the acceleration.

The use of two or four strain sensors in the vibration accelerometer of FIGURE 7 is best explained in connection with the circuit schematically illustrated in FIGURE 8. This circuit also embodies the present invention, but is a more sensitive arrangement than the embodiment of FIGURE 1. The series-connected strain sensor $R_G$ of FIGURE 1 has been replaced by a Wheatstone bridge circuit comprising four resistive arms and a voltage source or battery $e_1$. In accordance with the well-known operation of such circuits, when the resistances in the four arms are equal, the potential difference developed by the bridge across terminals $T_1$ and $T_2$ is zero. When the resistance in any arm changes, the bridge becomes unbalanced and a potential difference is developed between terminals $T_1$ and $T_2$. Since this adds to or subtracts from the potential difference imposed thereacross by the battery $e$, it affects the oscillator circuit in the same manner as a change in the potential difference developed across the series-connected strain sensor $R_G$ shown in FIGURE 1.

Figure 8:
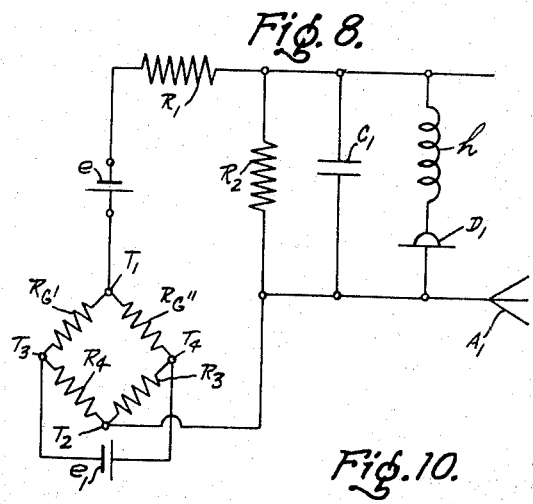
FIGURE 8 is a schematic diagram of an embodiment of this invention utilizing an alternative circuit.

As indicated in FIGURE 8, two piezoresistive strain sensors $R_G'$ and $R_G''$ are mounted in two adjacent arms of the bridge. Each of the resistors $R_3$ and $R_4$ must have a resistance equal to the unstrained resistance of the strain sensors. The positioning of the two sensors in the bridge depends on their mounting on the strained member. If the sensors are mounted on the member so as to be subjected to opposite types of strain (e.g., tension and compression or torsion in opposite directions), they must be connected in adjacent arms of the bridge so that their respective resistance changes are added by the bridge circuit to produce an output. If the sensors are mounted so as to be subjected to similar types of strain (e.g., both tension), they must be connected in opposite arms of the bridge. If these connections are reversed, the changes of the sensors will be cancelled by the bridge and the output will be zero.

Since the strain sensors as shown in FIGURE 7 are subjected to opposing strains by the movement of beam 22, the connection of the sensors shown in FIGURE 8, in adjacent arms, is required. It is also noted that any temperature variation affects both sensors in the same manner and both resistances either increase or decrease. Since the changes are in the same direction and the sensors are connected in adjacent arms of the bridge, the temperature effects cancel. Thus, the circuit of FIGURE 8 provides a temperature-compensated strain gage which also has a higher sensitivity than that of FIGURE 1. It is noted that the capacitor $C_2$ has been omitted in FIGURE 8 in accordance with the option noted in the discussion of FIGURE 1.

If desired in a particular situation, the two strain sensors may both be placed on the same side of beam 22, in which case the strain sensors are connected in two opposite arms of the bridge in accordance with the above discussion. In such case, however, temperature compensation is not achieved.

To further increase the sensitivity of this circuit, four strain sensors may be provided, one being connected in each arm of the bridge. In this arrangement, to prevent the effects from cancelling, the strain sensors connected in each pair of adjacent bridge arms must be subject to opposing strains upon a movement of the strained member. In the arrangements of FIGURES 7 and 8, this may be accomplished by placing the strain sensor which is connected in the position of $R_3$ in FIGURE 8 on the same side of the beam 22 as is strain sensor $R_G'$ and by placing the strain which is connected in the position of $R_4$ in FIGURE 8 on the same side of the beam 22 as is resistor $R_G''$. This same type of multiple sensor circuit may be used in the torsion measuring circuit of FIGURE 3.

Figure 9:
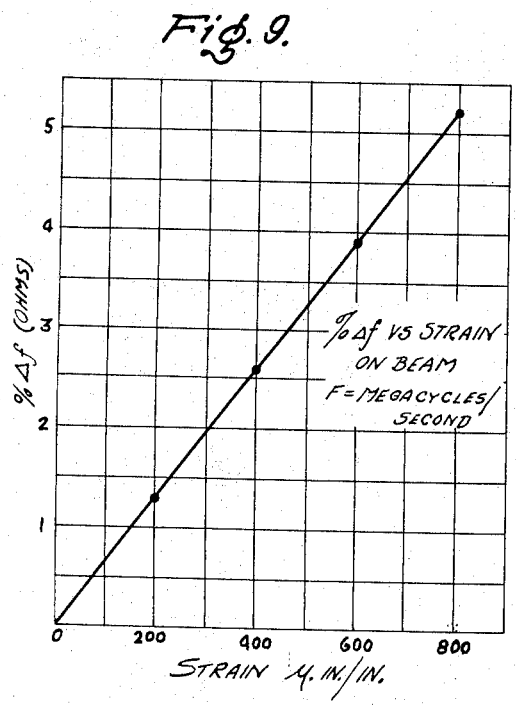
FIGURE 9 and 10 are graphs illustrating, respectively, the sensitivity and linearity of measurements made utilizing the self-transmitting strain gage of the present invention.
Figure 10:
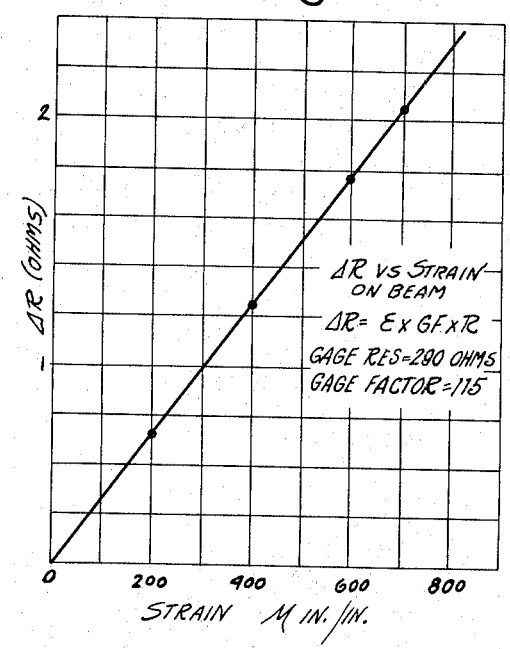

FIGURES 9 and 10 are graphical representations of measurements taken using a self-transmitting strain gage constructed in accordance with the present invention. The strain sensor selected for these measurements was of single crystal silicon, type P (111), having a resistivity of .01 ohm cm., and having dimensions of .0007" thick by .020" wide by .375" long. The active gage length was approximately .186" and the bulk resistance was approximately 290 ohms. The sensor was mounted on a cantilever bar by means of an epoxy resin adhesive and insulated therefrom by a glass coating. The transmitter circuit was constructed in accordance with that shown in FIGURE 1.

The receiver used in connection with these measurements was a General Electric Company AM-FM radio, model T210. The output of the radio was modified for connection of a recorder, specifically by connecting an inking recorder at the output of the detector in the radio.

FIGURE 9 illustrates the sensitivity of the self-transmitting strain gage when mounted on a cantilever beam. This data was taken at an oscillator frequency of 103 megacycles/second with the receiver at a distance of approximately 20 feet from the transmitter. This figure is a graph of the percent change of the frequency F against the strain on the cantilevered beam in microinches/inch. It is noted that a five percent frequency change was obtained for a strain of 770 microinches/inch, thus illustrating the high sensitivity obtainable from the self-transmitting strain gage of the present invention without the use of additional amplifying and transmitting circuits.

FIGURE 10 illustrates the linearity of the gage over the range of the piezoresistive sensor. This graph is a plot of the change in resistance against the strain on the beam. The change in resistance is equal to the strain in miroinches per inch times the gage factor or strain sensitivity of the sensor times the bulk resistance of the sensor.

It can thus be seen that the self-transmitting strain gage provided in accordance with the present invention has many potential practical applications, for example, the measurement of strain directly, the measurement of unidirectional or vibrational accelerations, or the measurement of pressure. It is particularly advantageous in applications where direct electrical connections are difficult, for example, in the case of rotating shafts or of internal human measurements, and is of even greater value in the situations where miniaturization is a critical factor. Again, the frequency shifts may be used to provide a binary coded output, thus facilitating automatic control of equipments.

The specific embodiments described herein are presented merely as examples of the various forms the practice of this invention may take. Therefore, it is intended in the appended claims to cover all modifications and variations which come within the true spirit and scope of this invention.

What I claim as new and desire to secure by Letters Patent of the United States is:

1. A gage for measuring pressures comprising a capsule; said capsule having a deformable diaphragm mounted within it, said diaphragm being mounted so that a predetermined pressure from said capsule will be exerted against one side thereof and being subject to a variable pressure against the other side; a strain sensor mounted on said diaphragm for measuring strains; an F.M. oscillator circuit having a tunnel diode and an inductance in series to form a series element arranged in said capsule; input means for connecting a source of electrical energy to said oscillator circuit; said strain sensor being electrically connected to said input means on one side and to said series of element of said oscillator at its other side for varying the frequency of said oscillator circuit in response to the variable pressure on the diaphragm.

2. A gage for measuring pressure as claimed in claim 1 wherein said capsule has an aperture therein for enabling application of said variable pressure to said diaphgram.

3. A gage for measuring pressure comprising a capsule having a centrally located tube therein, the exterior of said tube being subject to a variable pressure from the exterior of said capsule on one side and a constant pressure from the interior of said capsule on the other side, a strain sensor mounted longitudinally of said tube for measuring strain, an F.M. oscillator circuit having a tunnel diode and an inductance in series to form a series element arranged in said capsule, a source of electrical energy, said strain sensor being electrically connected at one end to said series element of said oscillator circuit and at its other end to one side of said source of electrical energy, the other side of said source of electrical energy being connected to said oscillator circuit so that the frequency of said oscillator circuit is varied in response to the pressure within said tube.

4. A gage for measuring pressure as claimed in claim 3 wherein said strain sensor partially encircles said tube for measuring hoop strain therein.

References Cited
UNITED STATES PATENTS

| | | | |
|---|---|---|---|
| 3,134,949 | 5/1964 | Tiemann | 33—107 X |
| 3,062,043 | 11/1962 | Marsh et al. | 73—88.5 |
| 3,034,356 | 5/1962 | Beiganski et al. | 128—2 X |
| 3,000,208 | 9/1961 | Piazza | 73—88.5 X |
| 2,943,480 | 7/1960 | Nelting | 73—88.5 |
| 2,420,148 | 5/1947 | Ostergren | 73—398 |
| 3,246,256 | 4/1966 | Sommers | 331—107 |

OTHER REFERENCES

In Radio & TV News, "Radio Pill Broadcasts from Stomach," June 1957, p. 114.

In Instrument Practice, "Negative Resistance Devices," November 1962, pp. 1369–1370.

RICHARD C. QUEISSER, *Primary Examiner.*

JAMES J. GILL, *Examiner.*

J. J. SMITH, C. I. McCLELLAND, *Assistant Examiners.*